United States Patent [19]
Schaller

[11] 3,724,648
[45] Apr. 3, 1973

[54] BAR FEEDER APPARATUS

[75] Inventor: Robert L. Schaller, Syracuse, N.Y.

[73] Assignee: Sundstrand-Engelberg, Inc., Liverpool, N.Y.

[22] Filed: Apr. 14, 1971

[21] Appl. No.: 133,912

[52] U.S. Cl..................198/211, 198/54, 198/103, 221/241, 221/298
[51] Int. Cl.............................................B65g 25/08
[58] Field of Search......198/53, 25, 56, 107, 211, 54, 198/103; 221/225, 233, 234, 236, 241, 251, 254, 266, 277, 301, 298; 74/243 PC

[56] References Cited

UNITED STATES PATENTS

| 3,184,034 | 5/1965 | Stuller et al. | 221/225 |
| 1,578,983 | 3/1926 | Gassett | 74/243 PC |
| 3,306,472 | 2/1967 | Blanz | 221/241 |
| 2,744,619 | 5/1956 | Olson | 198/211 |

FOREIGN PATENTS OR APPLICATIONS 616,143    8/1946    Great Britain.....................221/241

*Primary Examiner*—Evon C. Blunk
*Assistant Examiner*—H. S. Lane
*Attorney*—Bruns & Jenney

[57] ABSTRACT

Bar feeder apparatus for separating one bar at a time from a supply of bars so that the bars can be individually delivered to a bar working machine upon demand. The apparatus includes a rotatable transfer drum which picks up one bar at a time from the supply and delivers it to a downwardly inclined rack, the pick-up means of the drum being adjustable to enable it to accept bars of different diameters. At the lower end of the rack means are provided to retain the bars in a row on the rack, the retainer means also being adjustable for bars of different diameters. Cooperating with the retainer means is an actuator mechanism for releasing one bar at a time from the rack for delivery to the bar working machine.

2 Claims, 11 Drawing Figures

INVENTOR.
ROBERT L. SCHALLER
BY Bruno & Jenney
ATTORNEYS 3,724,648

BAR FEEDER APPARATUS

BACKGROUND OF THE INVENTION

This invention relates generally to material handling equipment, and has particular reference to an improved bar feeder apparatus for delivering bars one at a time to a bar working machine.

Modern bar working machines, such as automatic screw machines, turret lathes and particularly centerless grinders, are capable of working on bars having a substantial range of diameters. Such machines are usually provided with bar feeder apparatus which is constructed so that it is a difficult and time consuming operation to adjust the apparatus to enable it to handle stock bars having a diameter that varies greatly from the diameter of the bars previously handled. In some instances, the change may be so great as to require a substitution of components in the feeder apparatus.

SUMMARY OF THE INVENTION

The bar feeder apparatus of the present invention is adapted to select one bar at a time from a supply of bars for delivery to a bar working machine, and is provided with easily operable adjustment means for accommodating bars having a range of different diameters. The apparatus includes a novel transfer drum which rotates on demand, and as it rotates picks up one bar at a time from a supply of bars and delivers it to a downwardly inclined rack. The drum is comprised of a plurality of pairs of discs on a drive shaft with the discs being formed with spaced peripheral notches or cavities for receiving the bars. By adjusting the relative angular position of the two discs in each pair, their respective cavities can be brought into registry or made to overlap to a greater or less degree whereby the discs in each pair cooperate to permit cavity size adjustment. The adjustment can be effected by simply loosening the nuts on four tie rods which hold the drum together, turning the shaft a few degrees in either direction to obtain the desired cavity size, and thereafter tightening the tie rods, all as will be described more fully hereinafter.

The feeder apparatus of the invention also includes, at the lower end of the inclined rack referred to above, a bar retainer assembly which engages the lowest bar on the rack and prevents it and the bars behind it, which are disposed in a row on the rack, from leaving the rack. The retainer levers which actually engage the lowermost bar project above the rack and the height that they project is adjustable for bars of different diameters by a simple dial type control. A plurality of actuating levers cooperate with the retainer levers and are operable upon demand to push the lowermost bar from the rack for delivery, as by a conveyor, to the bar working machine.

DESCRIPTION OF THE PREFERRED EMBODIMENT

Figure 1:
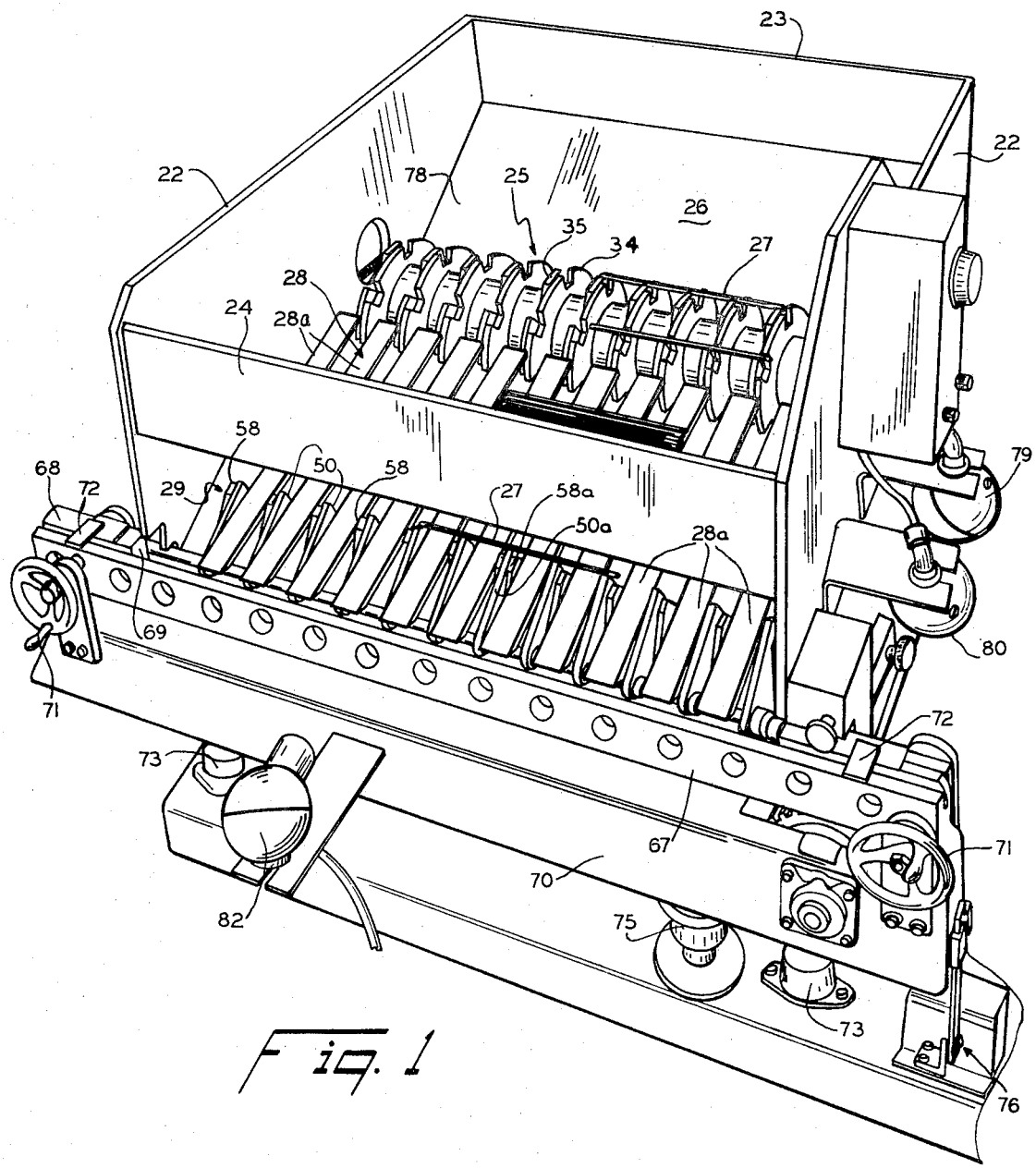
FIG. 1 is a perspective view of a bar feeder apparatus embodying the invention taken from the front thereof.
Figure 2:
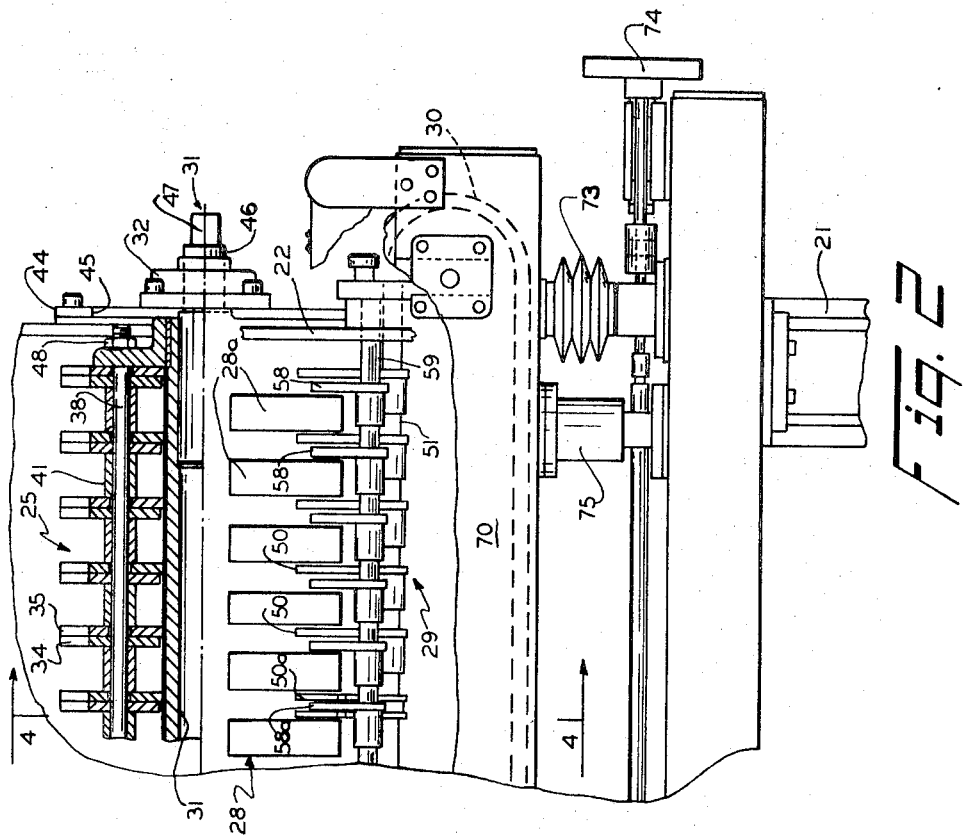
FIG. 2 is a fragmentary front elevation of the apparatus.
Figure 10:
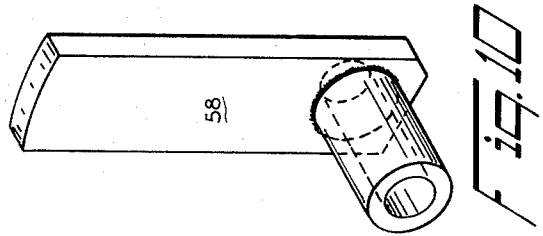
FIGS. 9 and 10, sheet 2 of the drawings, are enlarged perspective views of the retainer and actuator levers, respectively.
Figure 9:
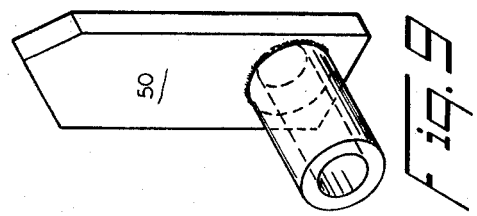
Figure 3:
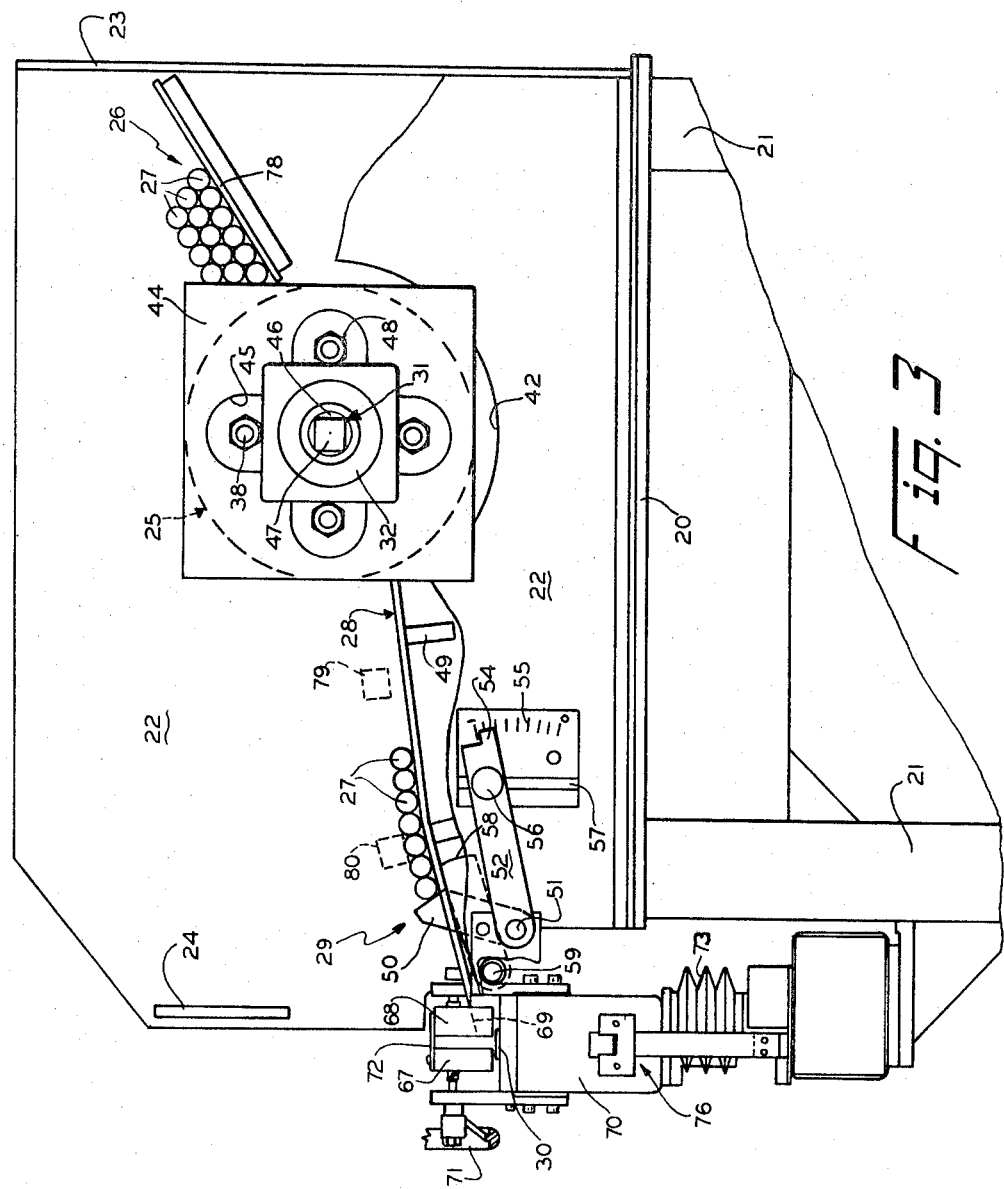
FIG. 3 is a fragmentary right side elevation thereof.

With particular reference to FIGS. 1–3 of the drawings, the bar feeder apparatus is supported by a table having top 20 and legs 21, and includes left and right frame side walls 22 connected together by a back wall 23 and one or more front plates 24. Broadly, the feeder comprises a rotatable bar transfer drum, generally indicated by reference number 25, a storage area 26 for a supply of bars 27 located behind the drum, an inclined rack 28 in front of the drum and a bar retainer assembly, generally indicated at 29, at the lower end of the rack. The drum 25 is adapted to pick up one bar at a time from the supply in the storage area and deposit it on the rack where it rolls down until stopped by the retainer assembly, or by the bar deposited on the rack just before it.

Figure 4:
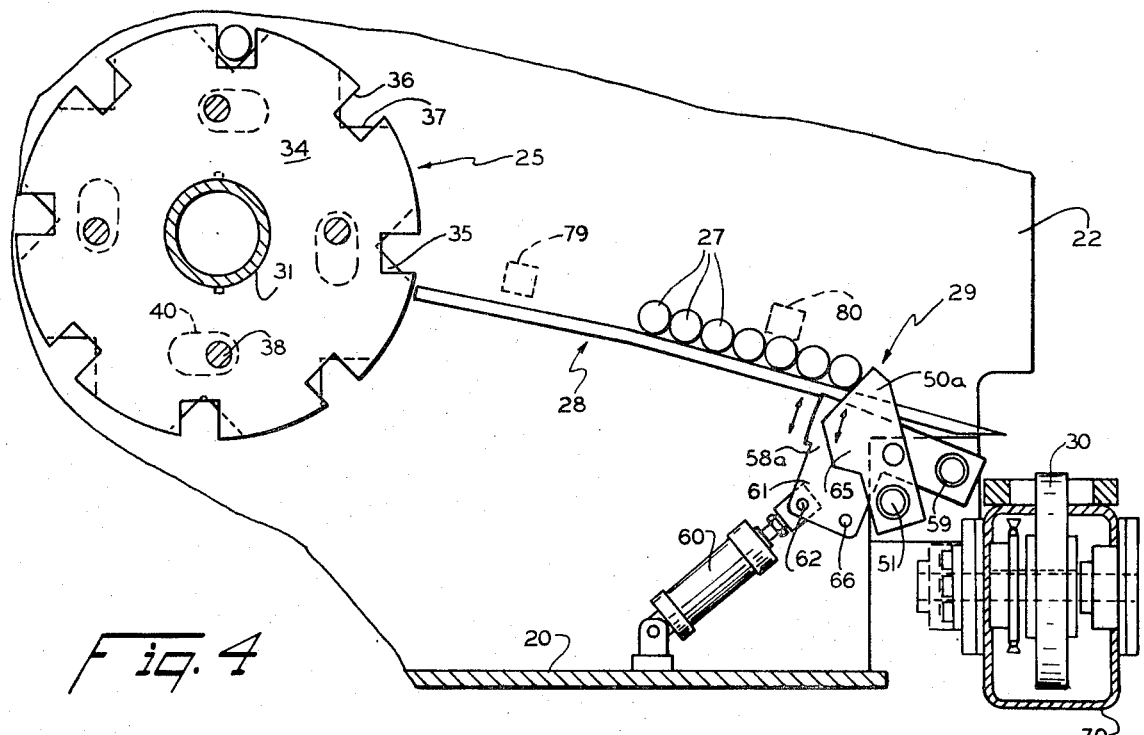
FIG. 4 is a transverse vertical section through the apparatus taken substantially on line 4—4 of FIG. 2.

The retainer assembly includes means for pushing one bar at a time over the retainer levers, to be described, whereby the bar is permitted to roll off the end of the rack and onto a conveyor belt 30, FIGS. 3 and 4. The conveyor carries the bar to a bar working machine (not shown) such as a centerless grinder. The bar transfer drum 25 is driven on demand by a motor (not shown) to supply bars as required to the rack 28. In addition to picking up one bar 27 at a time from the supply in the storage area 26, the rotation of the transfer drum operates to continuously roll other stock bars that are close to it which keeps the bars parallel to the drum axis.

The transfer drum 25 includes a tubular drive shaft 31 journalled in bearings 32 supported by the frame side walls 22. Mounted on the shaft are a plurality of uniformly spaced pairs of transfer discs, one disc 34 in each pair having a free fit on the shaft so as to be angularly movable relative thereto and the other disc 35 in each pair being fixed on the shaft as by being keyed thereto. The movable discs 34 are formed with a plurality of uniformly spaced, substantially rectangular peripheral bar receiving cavities 36, while the fixed discs 35 are formed with a like number of substantially triangular peripheral bar receiving cavities 37. The movable and fixed discs are disposed on the shaft 31 so that their respective peripheral cavities are in axial alignment with one another.

Figure 5:
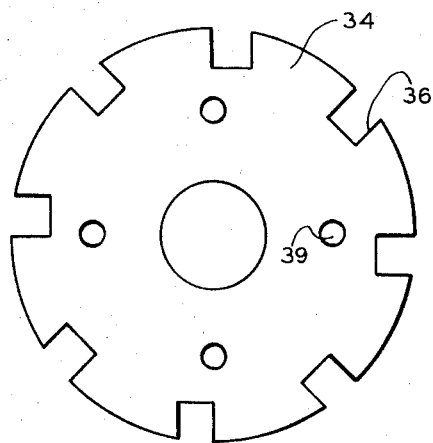
FIGS. 5 and 6 are side elevations of a movable and a fixed transfer drum disc, respectively.
Figure 6:
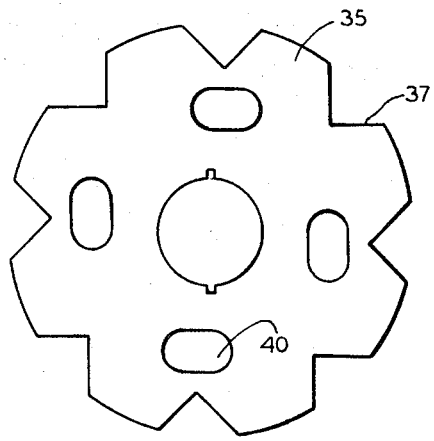
Figure 7:
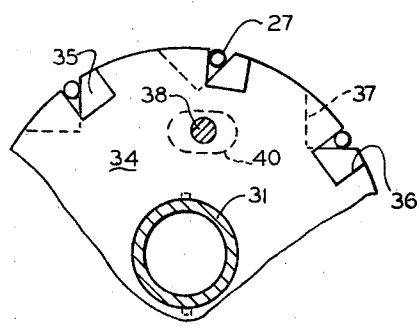
FIGS. 7 and 8 are fragmentary side elevations of one pair of drum discs in two different positions of cavity size adjustment.
Figure 8:
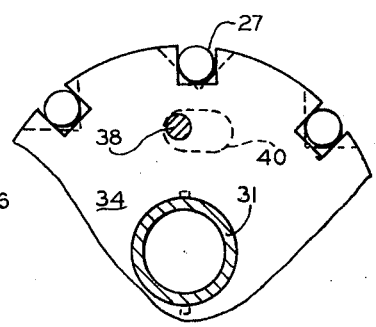

As indicated in FIGS. 4, 7 and 8, the fixed and movable discs 35,34 can be moved angularly relative to one another so that their respective cavities 37,36 are in full registry or overlap to a greater or less degree. In this manner, the two sets of peripheral cavities cooperate to enable the resultant cavities presented by the transfer drum to be varied as to size whereby bars of different diameters can be accommodated by the drum. All of the discs 34,35 in the drum are connected together by tie rods 38, FIGS. 2–4, which extend from end to end of the drum. In the illustrated embodiment there are four such rods spaced 90° apart, and they pass with a close fit through corresponding holes 39 in each of the movable discs 34 and through corresponding slots 40 in each of the fixed discs 35, FIGS. 5 and 6, spacer sleeves 41 being mounted on the rods between adjacent pairs of discs.

The right frame side wall 22, FIG. 3, is formed with a circular cut-out 42 having a diameter slightly larger than that of the transfer drum, and a plate 44 is secured to the outside of the wall so as to overlie most of the cut-out. Plate 44 is formed with a generally cruciform shaped cut-out 45, the 90° branches of which terminate in semi-circular arcs as shown. Plate 44 supports the drum shaft bearing 32 for the right end of the shaft, the latter having a short solid shaft extension or plug 46 secured in its open end which plug extends out through the center of the cut-out 45 and is carried by the bearing. Outwardly of the bearing, plug 46 is flatted so as to terminate in a squared end 47.

To adjust the transfer drum cavities to a size such that an axially aligned row of the cavities will accept only one bar of the size being worked, nuts 48 on the right ends of the tie rods 38 must first be loosened. These nuts are accessible with a wrench through cut-outs 45 and 42 in plate 44 and frame side wall 22, respectively. Thereafter, the squared end 47 of the drum shaft extension can be turned with a wrench to increase or decrease the size of the drum cavities. This occurs because when the shaft is turned, all of the discs 35 that are fixed on the shaft turn in unison with it relative to the discs 34 which are free on the shaft.

The fixed discs 35 can be adjusted angularly with respect to the movable discs 34 and tie rods 38 because the latter pass through the slots 40 in the fixed discs. Thus, the slots are long enough to permit sufficient relative movement so that the respective fixed and movable disc cavities can be adjusted between positions of full registry and almost total overlap, i.e., between the largest and smallest possible bar receiving openings; see FIGS. 4, 7 and 8. After the cavity adjustment has been made, the tie rod nuts 48 are tightened so that the adjustment will be maintained, and all of the discs and the drive shaft 31 are locked together for rotation as a unit during operation of the feeder.

As best shown in FIGS. 1–3, the inclined rack 28 comprises a plurality of spaced, parallel plates 28a which slope downwardly from the transfer drum to a point adjacent the conveyor belt 30 at the front of the machine. The plates are bent slightly near their midsections and are supported by bars 49 which extend across the machine between the frame side walls 22, FIG. 3.

The bar retainer assembly 29 is located near the lower end of the rack and includes a plurality of retainer levers 50 positioned between adjacent pairs of the rack plates 28a with their upper ends projecting above the plane of the rack. The purpose of these levers is to retain bars delivered by the transfer drum on the rack until needed, as indicated in FIGS. 3 and 4. The levers 50 are fixed on a common shaft 51 which extends across the machine and is journalled near its ends in portions of the frame.

The height that the retainer levers project above the rack is adjustable for bars of different diameters and to this end, the right end of shaft 51 has secured thereto a lever arm 52, FIG. 3, by means of which the shaft can be rocked to move the retainer levers up or down. At its free end, the lever arm 52 has a pointer 54 that coacts with a scale 55 which indicates the lever arm positions for various sizes of bars. The lever arm is held in adjusted position by a knob 56, the inner threaded end of which carries a "T" bolt (not shown) positioned in a corresponding "T" shaped slot 57 in the scale plate.

Cooperating with the retainer levers 50 is a second set of levers 58 which are the actuating levers for pushing one bar at a time over the retainer levers for delivery to the conveyor belt. The actuator levers 58 are also located in the spaces between the rack plates 28a, adjacent the retainer levers as best shown in FIG. 2. Levers 58 are normally disposed below the plane of the rack and are fixed on a common shaft 59 located slightly above and forward of the retainer lever shaft 51. Shaft 59 also extends across the machine and is journalled for rocking movement in portions of the machine frame. Levers 58 extend rearwardly beyond the retainer levers 50 just far enough to lift or push one bar over the retainer levers when the shaft 59 is rocked in the counter-clockwise direction as viewed in FIG. 3. In this connection, it may be seen that if the retainer levers are rotated clockwise so that they do not project as high above the rack as shown in FIG. 3, for a smaller diametered bar, the distance that the actuating levers 58 project beyond the retainer levers is correspondingly shortened, and vice versa.

Figure 11:
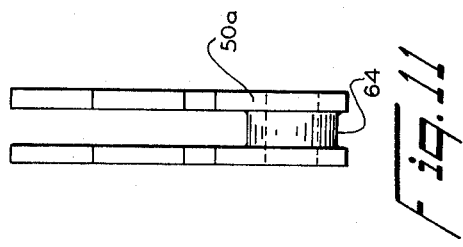
FIG. 11, sheet 3 of the drawings, is an enlarged end elevation of the center retainer lever.

The actuator lever shaft 59 is made to rock by an air cylinder 60 located approximately midway between the frame sidewalls, FIGS. 2 and 4. To enable this to be done, the center actuator lever 58a has a different configuration from the other actuator levers as does the corresponding center retainer lever 50a. Thus, as shown in FIG. 4, lever 58a has a substantially rectangular depending projection 61 to which the air cylinder piston is connected at 62. Retainer lever 50a differs from the others in that it is a double lever with its two parts separated by a sleeve 64 so as to have the form of a yoke, FIGS. 1 and 11. In addition, the two parts of lever 50a are formed with rearwardly extending projections 65, FIG. 4, not present on the other levers 50.

The center levers 50a,58a are arranged so that actuator lever 58a lies between the two parts or sides of lever 50a as best shown in FIG. 2. When the air cylinder 60 is actuated to force its piston outwardly, lever 58a is rocked in the clockwise direction as viewed in FIG. 4 causing its shaft 59 and all of the other levers 58 fixed thereon to rock with it. This rocking movement is limited to the extent necessary to push a bar over the retainer levers by a stop 66 on the depending projection of lever 58a which engages the rear edge of retainer lever 58a.

When a bar is released from the rack by the actuator levers 50, it rolls off the end of the rack and onto the conveyor belt 30 between a pair of adjustable work guides 67,68. The work guides are elongated bar members and because the lower end of the rack is below the top of the rear guide 68, FIG. 3, this bar is cut away between its ends as indicated at 69 to permit the bar to roll down to the conveyor belt. The conveyor mechanism, which is substantially conventional and plays only an incidental part of the invention, is contained in an elongated housing 70 located in front of and just below the low end of the rack 28. The conveyor belt moves the bar endwise to the left as viewed in FIG. 1 to a bar working machine, such as a centerless grinder, located just to the left of the feeder.

The spacing between the front and rear work guides 67,68 is adjustable to accommodate bars of different diameters and, because for a centerless grinder the axis of each bar must coincide with the predetermined passline of the grinder, both guides move towards or away from the conveyor belt centerline during the adjustment which is carried out by handwheels 71, FIGS. 1 and 3. Pointer plates 72 secured to the top of the front work guide 67 overlie scales on the rear work guide 68 so that the exact spacing between the bars can be visually determined.

For the bar axes of different size bars to coincide with the grinder passline, vertical adjustment means are required for the conveyor belt 30. This is accomplished by raising or lowering the conveyor housing 70 by means of jacks 73 of a well known type located near the ends of the housing, FIGS. 1–3. The vertical adjustment of the conveyor belt is effected by a handwheel 74, FIG. 2, and is guided by guides 75 positioned near the jacks. A pointer and scale combination, generally indicated at 76 in FIGS. 1 and 3, enables the desired adjustment to be made by visual means.

In the operation of the feeder described above, the storage area 26 is filled with a supply of bars 27 of the size for which the bar working machine is set. Prior to starting the feeder, the size of the transfer drum cavities is adjusted as previously described to permit each row of cavities to accept only one bar as the drum rotates. At the same time, the lever arm 52 is set to give the retainer levers the proper height above the rack, and the work guide spacing and conveyor height are adjusted according to bar diameter.

On starting the feeder, the drum rotates in the counter clockwise direction as viewed in FIG. 3 and as each row of drum cavities comes up to the bottom plate 78 of the storage area 26, gravity and the bars behind it push one of the stock bars into the cavities. The drum then carries the bar until the row of cavities is opposite the upper end of rack 28 at which time the bar rolls out of the cavities by gravity and down the rack until stopped by the retainer levers 50 or the previous bar. With this arrangement, the bars become lined up on the rack in a single row, FIGS. 3 and 4, as is desired.

The rotation of the drum occurs on a demand system that is triggered by a pair of photocells 79 and 80 indicated diagrammatically adjacent the upper and lower ends of the rack in FIGS. 3 and 4. Thus, when the number of bars on the rack is reduced to the point where there is no bar opposite the lower photocell 80, the latter fires and actuates drum rotation whereby a new supply of bars is delivered from the storage area to the rack. When this supply has reached the point where there is a bar opposite upper photocell 79, the latter fires and stops the drum rotation.

The actuator levers 58 that push one bar at a time over the retainer levers and onto the conveyor belt also operate on a demand system. Thus, a third photocell 82, FIG. 1, is mounted on the conveyor housing in line with bars passing on the belt and as a bar goes by the cell it cocks and after it has gone by (so there is no bar opposite) it fires. The firing of the cell 82 causes the air cylinder 60 to be actuated whereby the actuator levers are rocked to feed another bar to the conveyor.

From the foregoing description, it will be apparent that the invention disclosed herein provides a novel and efficient bar feeder apparatus. As will be understood by those familiar with the art, the invention may be embodied in other specific forms without departing from the spirit or essential characteristics thereof.

I claim:

1. In a bar feeder apparatus, a rotatable bar transfer drum for separating one bar at a time from a supply of bars as the drum rotates, the drum comprising a drive shaft, a plurality of uniformly spaced pairs of discs mounted on the shaft, one disc in each pair being fixed on the shaft and the other being angularly movable relative thereto, each disc in the disc pairs being formed with a plurality of bar receiving cavities spaced uniformly about its periphery, the two discs in each pair being angularly movable relative to one another to bring their respective cavities into a predetermined degree of registry for receiving a bar of a given diameter, a plurality of elongated tie rods passing through all of the discs together with means to tighten the rods so that the discs are maintained in fixed relation to one another after the cavity adjustment has been made, the tie rods passing through closely fitting holes in the movable discs and through slots in the fixed discs, and means connected to the drive shaft and operable before the tie rods have been tightened to vary the angular position of the shaft whereby the angular position of the fixed discs relative to the movable discs can be adjusted.

2. In a bar feeder apparatus, including an inclined rack comprising a plurality of spaced, parallel plates, a bar retainer assembly located adjacent the lower end of the rack and comprising a plurality of retainer levers disposed between adjacent pairs of plates and projecting above the upper surfaces thereof, the levers being fixed on a common shaft journalled for angular movement whereby the height of the levers above the rack plates can be adjusted, a plurality of operator levers respectively positioned adjacent the retainer levers and normally disposed below the upper surfaces of the rack plates, the operator levers being fixed on a second common shaft, means to rock the last-named shaft and rotate the operator levers whereby a bar resting against the retainer levers is pushed over the latter and can leave the rack, a lever arm operably connected to an end of said first-named common shaft, a scale coacting with said lever arm, and means to secure the arm in any desired position with respect to the scale to set the retainer levers at the desired height above the rack plates.

* * * * *